United States Patent Office 3,003,007
Patented Oct. 3, 1961

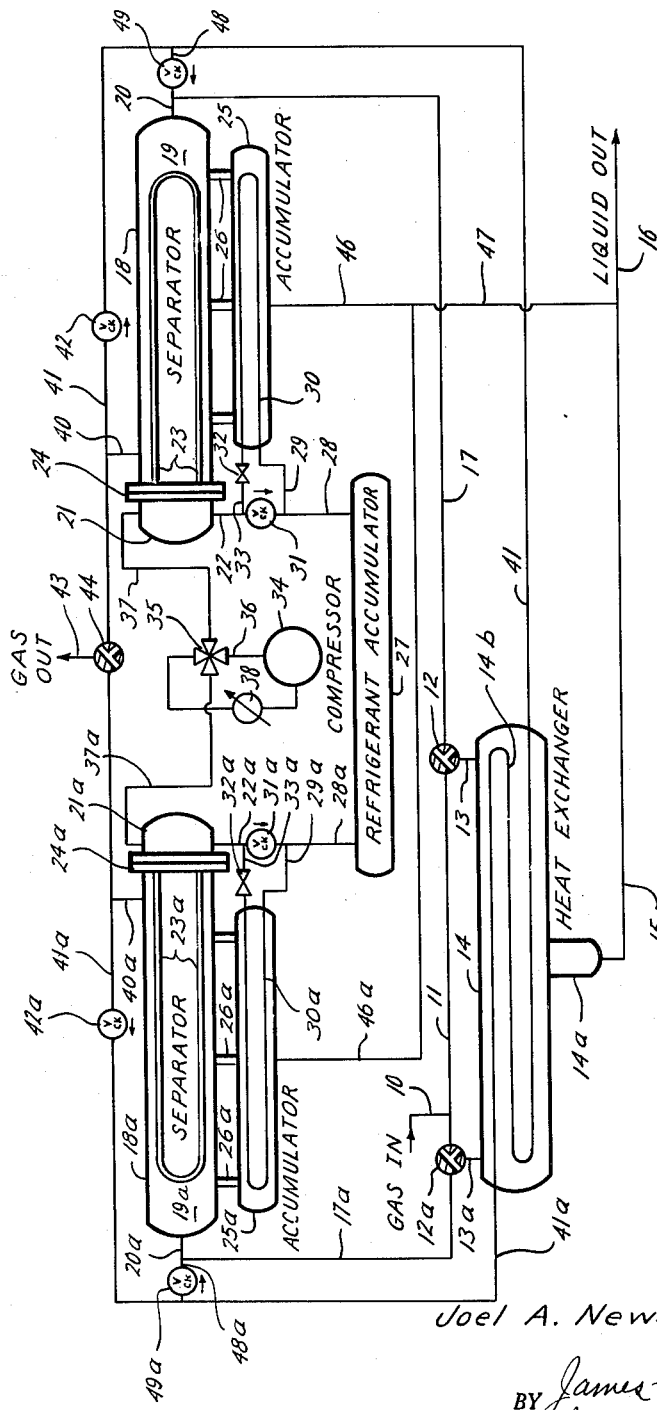

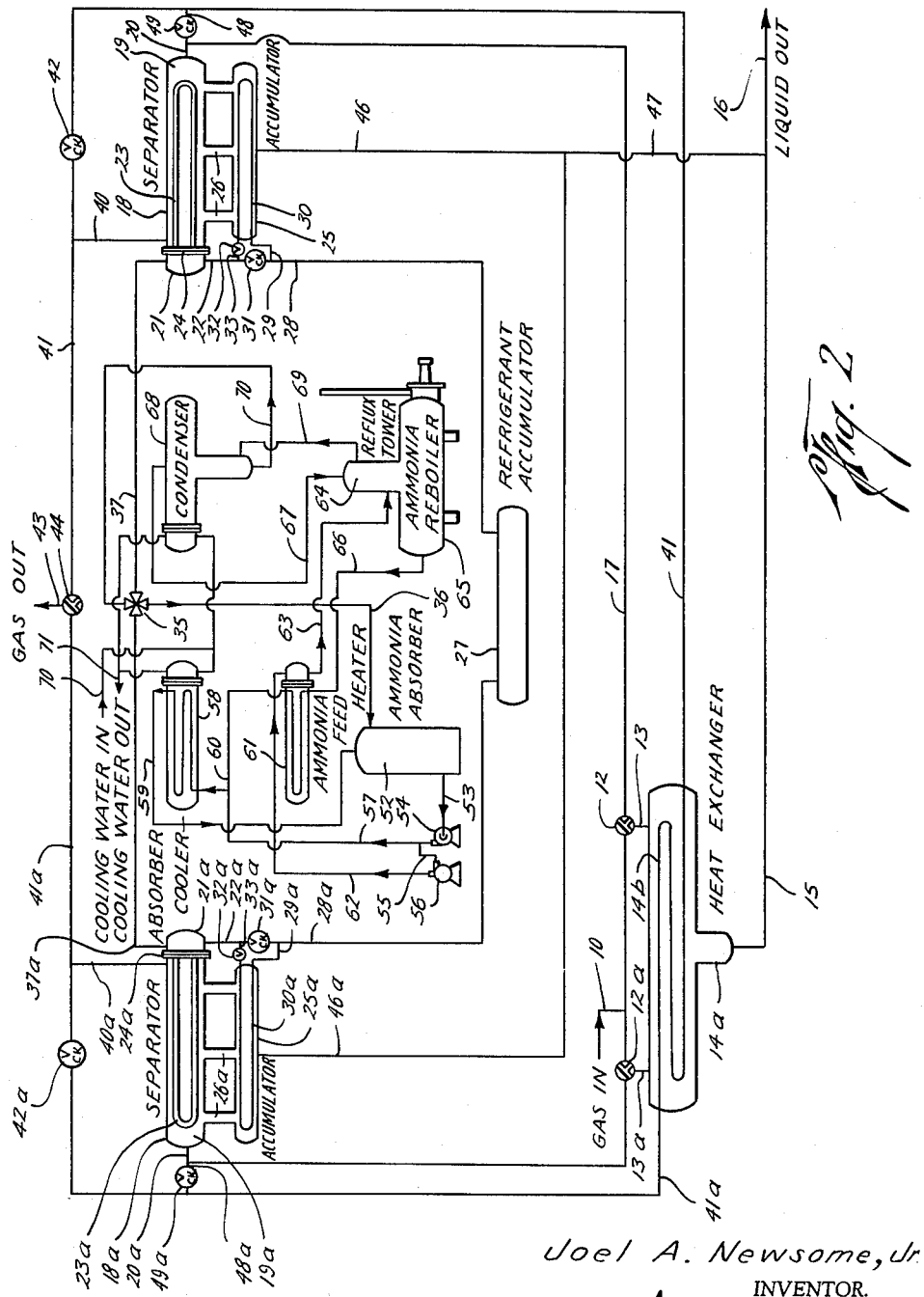

3,003,007
METHOD OF AND MEANS FOR REMOVING CONDENSABLE VAPORS CONTAINED IN MIXTURES
Joel A. Newsome, Jr., Houston, Tex., assignor, by mesne assignments, to Gas Processors, Inc., Houston, Tex., a corporation of Texas
Filed May 26, 1958, Ser. No. 737,966
7 Claims. (Cl. 260—676)

The present invention relates to methods of and means for removing and recovering condensable vapors contained in mixtures and more particularly relates to the recovery of condensable hydrocarbon vapors and removal of water vapors and impurities from hydrocarbon vapors in relatively low pressure systems, for example, certain of those produced as natural gas from well bores.

The present invention is particularly suited for the recovery of condensable vapors where a pressure drop is undesirable, for example, to systems under relatively low pressure, for example pressures up to about 500 p.s.i.g., although the invention is suited for other pressure ranges, and is particularly directed to recovery of condensable vapors from natural occurring deposits. For the purpose of disclosure, an example of the invention is described in this connection. It will be understood, of course, that the invention may be adapted to other uses which will readily be apparent to those skilled in the art.

In the production of liquid fuels from natural occurring deposits, such as oil, gas and like wells, a large amount of vapors are produced as a part of the total fluid. In my copending application, Serial No. 502,995, filed April 21, 1955, now abandoned, a method of and means for removing these vapors is described and claimed. In my copending application, Serial No. 600,059, filed July 25, 1956, now Patent No. 2,928,885 such a method and means are described and claimed which utilizes a pressure drop to provide the desired lowering of temperature. The present invention is directed to a continuous method and means similar to the last-mentioned application, but is particularly suited for low pressure systems in which the use of a pressure drop is not feasible or not desired for various reasons.

The present application is a continuation-in-part of application Serial No. 600,077, now abandoned, filed July 25, 1956.

The present invention does not rely on the cooling effect produced by expansion of gas, but utilizes external refrigeration in an improved and advantageous manner. The advantageous and satisfactory results of the present invention have been obtained by the deliberate formation of ice or gas hydrates in portions of the system and by alternately recycling so that ice or gas hydrates are formed in other portions of the system and those previously formed are melted and removed from the system.

In previous systems it has been the practice to prevent the formation of hydrates or ice in reducing the temperature of the system for the recovery and removal of these vapors. To this end, chemical inhibitors have been injected into the feed gas. While these inhibitors tend to prevent the formation of gas hydrates, this is not entirely satisfactory due to the fact that the inhibitors are either completely lost or if an attempt is made to recapture the inhibitor, only a portion is recaptured at great expense. For example, using alcohol as an inhibitor, the inhibitor is lost completely which adds considerably to the expense of the recovery system. If a very expensive chemical inhibitor is used, for example, ethylene glycol, a large portion is recaptured, but it must be purified with field equipment before it can be reused. The addition of a chemical inhibitor and either losing or recapturing and purifying a portion of the same is a substantial and major expense of the entire recovery system.

It is therefore a general object of the present invention to provide an improved method of and means for liquefaction of condensable vapors contained in mixtures in relatively low pressure systems or in such systems where it is desirable not to utilize a pressure drop so that the liquefied vapors may be separated and removed from the system.

It is a further object of the present invention to provide such an improved method and means for liquefaction of hydrocarbon vapors contained in mixtures in relatively low pressure systems or systems in which a pressure drop is not desired so that liquefied hydrocarbon vapors may be separated and recovered from the system.

It is yet a further object of the present invention to provide such a method and means in which it is unnecessary to add any chemical inhibitor to the vapors thereby avoiding the expense of adding the same.

It is yet a further object of the present invention to provide such an improved method and means which utilizes the noncondensed vapors effectively and efficiently in separating condensable vapors from mixtures containing them.

Yet a still further object of the present invention is the provision of such an improved method and means in which condensable vapors are liquefied and removed and which includes the removal of impurities entrained in the condensable impurities contained in the condensable vapors from the uncondensable vapors.

A still further object of the present invention is the provision of a continuous method of and means for the liquefaction of vapors contained in mixtures in relatively low pressure systems or in systems in which a pressure drop is not desired which is reversible in operation so that cycling may take place to provide a predetermined formation of hydrates or solids in a portion of the system during which time the formed hydrates and formed solids are melted and removed in another portion of the system.

Yet a further object of the present invention is the provision of apparatus including a pair of separators joined to each other by flow lines to a common heat exchanger and which includes a refrigerating system common to both separators arranged so that the warmed refrigerant from one separator is cooled in part in the other separator by the cooled uncondensed vapors of the one separator and these cooled uncondensed vapors are utilized in indirect heat exchange relationship in the heat exchanger for initially cooling and condensing a portion of the incoming vapors.

A still further object of the present invention is the provision of such an apparatus in which the heat exchanger is of elongate construction and which includes reversing or cycling means so that the incoming warm vapors periodically enter opposite ends thereof in order that solids are deliberately formed at one end while previously-formed solids are melted and removed from the system at the other end.

A still further object of the present invention is the provision of such an apparatus which includes means for reversing the flow through the system so that solids formed in one part thereof are periodically melted and removed while solids are being formed in another portion of the system thereby providing a continuous system.

Other and further objects, features, and advantages will readily be apparent as a description of a presently preferred example of the invention, given for the purpose of disclosure, proceeds.

While the invention may be applied to other systems and other uses, as previously mentioned, for the purpose of disclosure, the invention is described as it may be applied to flow lines or pipes through which hydrocarbon vapors pass from their source to a distribution system. As mentioned before, however, the invention may be used with any suitable system and in many places in the system, but is particularly directed to continuous systems under relatively low pressures or in systems in which it is not desired to utilize a pressure drop, although a pressure drop may be used, if desired.

The present invention utilizes a refrigerant in indirect heat exchange relationship with the hydrocarbon vapors as a means of reducing the temperature of the system, but differs from previous continuous systems in that gas hydrates or solid particles are deliberately formed and periodically liquefied in corresponding portions of the system so that they may be removed from the system without interrupting the flow of vapors therethrough. Chemical additives are unnecessary to the system; however, if desired, chemical additives may be added to increase the effectiveness of the present invention although highly satisfactory results have been obtained without using this expedient.

In the production of hydrocarbons from natural formations, such as oil and gas wells, it is common practice to flow the produced fluids through a conductor pipe set in the earth to surface equipment for the removal of fractions and/or the removal of impurities, such as water, and then through pipes to a distribution system. Unless a method of and means for the removal of water vapor and/or impurities are provided, the hydrocarbon vapor system will be saturated with water vapor and/or include impurities at the temperature and under the pressure conditions of the distribution system. In common practice these systems are maintained at the temperature of the surrounding atmosphere and/or the media through which they pass or, under certain conditions, at a temperature in excess of the surrounding media in order to prevent the formation of solid particles, such as gas hydrates or ice in the system. As mentioned previously, however, the advantages, objects and ends of the present invention are achieved by the deliberate formation of gas hydrates or ice in portions of the system and by reversing the system so that formed gas hydrates or ice are melted and removed from the stream while others are formed in corresponding other portions of the system.

For simplicity in disclosure in describing an apparatus according to the invention and the method involved in using this particular apparatus, the reversing or cycling of the system and apparatus is described as manual. It will be understood, however, that this reversing or cycling can be done automatically, such as by suitable pressure differential controls, temperature controls and the like, if desired. The apparatus of the invention will best be understood by reference to the accompanying drawings where—

FIGURE 1 is a flow diagram illustrating one form of apparatus according to the invention, and FIGURE 2 is a flow diagram illustrating a modified form of the apparatus.

Before referring to the drawings, the apparatus of the invention comprises in general a pair of separators interconnected by vapor flow lines through a heat exchanger, and a refrigeration cycling system is provided for reducing the temperature of the system which includes heat exchanger tubes in each of the separators. Flow lines are provided from the vapor outlet of each separator to heat exchanger tubes disposed in the heat exchanger and then to the vapor inlets of the other separator so that cooled uncondensed gas from the separator on the cold cycle is used for reducing the temperature of the incoming feed gas in the heat exchanger before the uncondensed feed gas is passed to that separator for cooling and liquefying condensable vapors. The warmed but still cool uncondensed gas from the heat exchanger tubes is then passed into the other separator where it cools the refrigerant cycled from the separator on the cool cycle. Thus, condensation and separation of condensable vapors takes place first in the heat exchanger and then in one separator and then in the other separator below hydrate forming temperature. Reversible control means are provided to reverse the flow of vapors and refrigerant through the system so that the previously-formed hydrates or ice in one separator and in the cooled end of the heat exchanger are melted and removed from the system while condensation and separation take place along with the formation of hydrates and ice in the other separator and the previous warm end of the heat exchanger. Any preferred refrigeration system may be utilized, for example, an absorption refrigeration system or a refrigeration system of the compressor type.

Referring now to FIGURE 1, the reference numeral 10 designates a flow line or a gathering pipe which conducts a gas stream, such as well effluent, including a mixture of vapors, from its source to a distribution system, not shown. The source may be the well proper or separation equipment to separate liquid from gas or from any other source. In the case of oil and gas wells, the flow stream in the pipe or flow line 10 usually consists of gaseous and liquid hydrocarbon components and water in vapor phase, as well as impurities in vapor phase, such as carbon dioxide, and the like. The mixture of vapors in the flow line or gathering pipe 10 ordinarily is at a relatively low pressure, for example under 500 p.s.i.g. and ordinarily is at an elevated temperature, say 80° F., although it may be at different pressures and temperatures.

The well effluent entering the system through the gathering pipe 10 first passes into the flow line 11 connected to the gathering line 10 which has the three-way valves 12 and 12a for directing flow in lines 13 and 13a connected thereto and to opposite ends of the heat exchanger 14.

The heat exchanger is preferably of generally elongate cylindrical construction and has the pipes 13 and 13a connected at opposite ends so that flow through the heat exchanger may be reversed for melting solids formed at one end while forming solids at the other end and vice versa, as will be explained in detail later. An accumulator 14a of generally cylindrical construction extends downwardly from the lower central portion of the heat exchanger 14 and has the discharge line or pipe 15 connected to its lower portion and to the discharge pipe 16 for discharge from the system of condensed liquids accumulated in the accumulator 14a.

As will be apparent later, depending upon the position of the three-way valves 12 and 12a, gas entering the system in line 10 flowing into flow line 11 will enter the heat exchanger 14 by one of the lines 13 or 13a and leave the heat exchanger by the other of those lines. The temperature of the incoming gas is lowered in the heat exchanger 14 below hydrate forming temperature, for example 40° F., and the solids are deposited on the external walls of the heat exchanger tubes 14b disposed therein, as described later.

The flow lines 13 and 13a are connected through the three-way valves 12 and 12a to the flow lines 17 and 17a which are connected to one end of the pair of separators 18 and 18a. These separators are identical in construction and include what might be termed the separation vessels 19 and 19a which are generally of elongate cylindrical construction, the flow lines 17 and 17a being connected by the interconnected inlet lines 20 and 20a connected to the ends of these separators for introducing uncondensed vapors into an end of the separators 18 and 18a.

Each separator is provided with a head 21 and 21a at the opposite end thereof into which liquid refrigerant flows from the refrigerant flow lines 22 and 22a connected thereto.

The heat exchanger tubes 23 and 23a are disposed in the separation vessels 19 and 19a and are connected to the refrigeration heads 21 and 21a so that refrigerant flows therethrough. The flanges 24 and 24a are provided for securing the heads 21 and 21a to the separation vessels 19 and 19a, respectively, such as by bolting, not shown, although these may be secured thereto in any desired manner.

Each separator 18 and 18a is provided with a generally elongate, cylindrical accumulator 25 and 25a disposed below and generally parallel to the separation vessels 19 and 19a, which are connected thereto by means of the horizontally-spaced, downwardly-extending pipes or hollow legs 26 and 26a, respectively.

Thus, the vapors entering the separation vessels 19 and 19a in the lines 20 and 20a, respectively, are cooled and the condensed liquids are collected in the accumulators 25 or 25a or if on the warm side of the cycle, the cooled vapors melt the solids previously formed during the cold cycle of that particular separator which are collected in that particular accumulator.

A refrigerant accumulator 27 is provided which is connected by the refrigerant flow lines 28 and 28a to the refrigerant flow lines 29 and 29a connected to the heat exchanger tubes 30 and 30a disposed in the accumulators 25 and 25a, respectively. The check valves 31 and 31a prevent flow of refrigerant from lines 28 and 28a into lines 22 and 22a, respectively.

A compressor 34 is provided for compressing the refrigerant and is interconnected through the four-way valve 35 by the line 36 and the lines 37 and 37a connected thereto and connected to the upper ends of the heads 21 and 21a of the separation vessels 19 and 19a, respectively. Also provided is the heat exchanger 38 connected to the compressor and four-way valve 35 by the flow line 39. As will be apparent later, refrigerant vapors leave the heads 21 and 21a and their pressure is increased by the compressor to a level necessary for condensation, for example 220 p.s.i.g., the super heat of the refrigerant vapors being removed by the heat exchanger 38 into the atmosphere, either by air cooling, water cooling or other means for reducing the temperature of these vapors to a level slightly above the condensation point, for example 120° F. or to condensation temperature, for example, 100° F.

Turning again to the passage of vapors through the system, the uncondensed and cooled vapors from the separation vessels 19 and 19a leave the opposite ends thereof by the pipes or flow lines 40 and 40a connected thereto which are connected to the flow lines 41 and 41a which are provided with the check valves 42 and 42a, respectively, and are also connected to the gas outlet pipe 43 by the three-way valve 44.

The uncondensed vapor discharge flow lines 41 and 41a are interconnected by being connected to opposite ends of the heat exchanger tubes 14b disposed in the heat exchanger 14.

Condensate discharge lines 46 and 46a are connected to the lower portion of the accumulators 25 and 25a, respectively, for discharging collected condensed liquids from these accumulators, which lines are connected to the common header 47 which in turn is connected to the liquid discharge line 16 for removal of condensed liquids from the system.

Each flow line 41 and 41a is connected by the flow lines 48 and 48a to the inlet lines 20 and 20a to the separation vessels 19 and 19a, respectively. The check valves 49 and 49a are provided in the lines 48 and 48a, respectively, to prevent flow of vapors entering the system and passing through the heat exchanger from flowing into the flow lines 41 and 41a.

In operation, gas enters the inlet pipe 10 from a gathering system or other source, not shown, under a relatively low pressure, for example, under 500 p.s.i.g. and at a relatively high temperature, for example 80° F. or higher. Assuming first that separation is to take place in separator 18 and defrosting or melting of previously-formed solids is to take place in separator 18a, the three-way valves 12 and 12a and 44, and the four-way valve 35, are positioned to direct the flow of vapors and refrigerant in that direction. Thus, the gas entering the system from gathering line 10 flows into line 11, through the three-way valve 12a and line 13a into one end of the heat exchanger 14 where the temperature level is reduced as the gas passes along the heat exchanger tubes 14b of the heat exchanger 14. For example, the gas may be reduced to a temperature below hydrate stability for its pressure condition which results in hydrocarbons and water being condensed and hydrates formed. The liquids are collected in the accumulator 14a and discharged from the system in discharge lines 15 and 16. The solids are deposited on the external walls of the heat exchanger tubes 14b at what might be termed the cold end of the heat exchanger 14, that is, the end away from the entry 13a of the relatively warm gases entering the heat exchanger.

Uncondensed vapors leave the heat exchanger 14 in flow line 13 through three-way valve 12 into line 17 and line 20 into the end of the separation vessel 19 of the separator 18, flow of these vapors in line 48 being prevented by the check valve 49. The temperature of the vapors in the separation vessel 19 is reduced to a low level, for example, 0° F., by indirect heat exchange with the boiling refrigerant present in the heat exchanger tubes 23. Additional liquids are therefore condensed from the stream and collected in the accumulator section 25 of the separator 18. The accumulated liquids in the accumulator 25 are discharged from the system in discharge lines 46, 47 and 16.

Solid hydrates and/or ice are formed in the separation vessel 19 and are deposited on the walls of the heat exchanger tubes 23, the cooled uncondensed vapors passing out of the separation vessel 19 in line 40 and into flow line 41 through check valve 42 into the heat exchanger tubes 14b disposed in the the heat exchanger 14. As the cooled uncondensed vapors flow through the heat exchanger tubes 14b, heat is exchanged with the warmer, incoming gas, raising the temperature of the cooled uncondensed vapors to a temperature above that at which hydrates are formed, for example, to about 50° F., at the exit of the heat exchanger tubes where they are withdrawn through pipe 41a, flow line 48a, check valve 49a and into flow line 20a which introduces the warmed gases into the separation vessel 19a of the separator 18a the cooled gas being prevented from passing through the check valve 42a. The gas now receives heat from the refrigerant vapors and/or liquids present in the tubes 23a of the separation vessel 19a thereby elevating the gas temperature, that is to about 100° F., and cooling the refrigerant vapors in these tubes to a point where they return to liquid state and/or subcooling the liquid refrigerant. The warmed uncondensable gas or vapors is withdrawn from the separation vessel 19a through the pipe 40a and pipe 41a through the three-way valve 44 out the gas discharge line 43 into a distribution system or other system, not shown.

Passing now to the refrigerant cycle, liquid refrigerant, for example ammonia, although others may be used, is accumulated in the refrigerant accumulator 27 under pressure sufficient to maintain it in liquid state, for example, 200 p.s.i.g. The liquid refrigerant is passed through the pipe 28, pipe 29 into the heat exchanger tubes 30 of the accumulator 25 where heat in the liquid refrigerant is exchanged into the cold liquids accumulated in the accumulator 25 for warming them to prevent the formation of ice or other solids in the flow lines to insure free flow of liquids therein.

The liquid refrigerant leaves the heat exchanger tubes 30 and flows through the expansion valve 32 and interconnected flow lines 33 and 22 into the refrigerant head 21 of the separation vessel 19. This results in lowering the pressure of the liquid refrigerant to a very low pressure, for example, 3 p.s.i.g., resulting in a very low temperature, for example —20° F. The check valve 31 prevents flow of the liquid refrigerant from line 28 under pressure into the flow line 21 for flowing into the head 21 without first passing through the heat exchanger tubes 23 and expansion valve 32.

Heat obtained from the gas passing through the separation vessel 19 causes the liquid refrigerant to boil in the heat exchanger tubes 23 and the refrigerant vapors so formed are passed into the upper portion of the refrigerant head 21 and are withdrawn in pipe 37 through the four-way valve 35 which is positioned to direct these vapors through flow line 36 into the compressor 34 which compresses these vapors to a pressure level necessary for condensation, for example 220 p.s.i.g., although their temperature is high enough so that they remain in vapor state.

The super heat of the refrigerant vapors is removed by the heat exchanger 38 into the atmosphere by flowing thereto in the line 39 and then through the four-way valve 35 into flow line 37a into the head 21a of the separation vessel 19a. The heat exchanger 38 may be any desired type, as mentioned previously, for example air cooled, water cooled and the like, and reduces the temperature of the vapors to a level slightly above their condensation point, for example 120° F. at 220 p.s.i.g. or to the condensation point, for example, 100° F.

The refrigerant vapors and/or liquid in the refrigerant head 21a pass through the heat exchanger tubes 23a melting the solids formed thereon and also lose heat to the colder gas passing through the separation vessel 19a. This results in loss of heat by the refrigerant vapors and/or liquids causing them to go into liquid phase, the liquid being accumulated in the refrigerant head 21a at its lower portion and draining or being withdrawn by the flow line 22a, through check valve 31a, flow line 28a back into the refrigerant accumulator 27 where the liquid refrigerant is stored for reuse.

Before sufficient solid hydrates and/or ice have accumulated on the heat exchanger tubes 14b of the heat exchanger 14 and the heat exchanger tubes 23 of the separation vessel 19 to block the flow of vapors through the system, the position of the valves 12, 12a, 35 and 44 are reversed. This can be done manually or automatically and may be controlled by time, temperature, flow rate, pressure differential or other means. No detailed description is given of these means or of the various valves and check valves as these elements are conventional, and as such do not form the present invention and are readily available on the commercial market.

When the valve positions are reversed, the flow of gas and refrigerant is completely reversed and no detailed description of the reversed flow is deemed necessary. It should be noted, however, that the temperature of the entering gas at the opposite end of the heat exchanger 14, in flow line 13, is sufficiently high to melt the solids previously formed at that end of the heat exchanger 14 while solids are being formed at the other end. Also, in making this reversal, the heat of the refrigerant vapors causes the solids accumulated on the external walls of the heat exchanger tubes 23 in the separation vessel 19 during the previous cycle to melt, the liquids thus formed being separated from the vapors and accumulated in the accumulator vessel 25 and withdrawn from the system as previously described.

It is therefore noted that the present system constitutes a completely continuous one in which ice hydrates or solids are deliberately formed and periodically melted, the system including reversible controls so that it is a continuous one.

Referring now to FIGURE 2, the apparatus of FIGURE 1 is illustrated in which an adsorption recycle system is substituted for the compressor-type refrigerant cycle. Corresponding reference designations have been made to parts of the apparatus common to both FIGURES 1 and 2 and different reference numerals have been applied to the absorption refrigeration system illustrated in FIGURE 2.

As mentioned in connection with the apparatus disclosed in FIGURE 1, heat obtained from the gas passing through the separation vessel 19 causes the liquid refrigerant to boil in the heat exchanger tubes 23 and the refrigerant vapors so formed are passed into the upper portion of the refrigerant head 21 and are withdrawn in the pipe 37 through the four-way valve 35 which is positioned to pass these vapors through the flow line 36. In this case, however, rather than directing the refrigerant vapors to a compressor as in FIGURE 1, the refrigerant vapors are directed to an ammonia absorber 52 where the ammonia vapor is absorbed in a weak solution of ammonia in water, referred to as "weak aqua," forming a strong solution of ammonia in water referred to as "strong aqua." The strong aqua flows from the ammonia absorber through line 53 to the strong aqua pump 54.

The discharge from the strong aqua pump 54 is divided into two parts, one part going to the feed pump 56 through the suction line 55 and the other part going through flow line 57 to the absorber cooler 58. The strong aqua in flow line 57 is mixed with weak aqua from the ammonia feed heater 61 and passed to the absorber cooler 58 where it is cooled and returned to the ammonia absorber 52 through flow line 59.

The strong aqua going to the feed pump 56 through the suction line 55 is pumped through the discharge line 62 to the ammonia feed heater 61 where its temperature is increased by indirect heat exchange with the weak aqua from the ammonia reboiler 65. The strong aqua then flows through the line 63 to an intermediate tray, not shown, in the reflux tower 64 and from there to the reboiler 65 forming a part thereof. Heat by suitable means, not shown, is supplied in the ammonia reboiler 65, driving off ammonia and water vapors from the strong aqua. The ammonia and water vapor flows through the trays of the reflux towers 64 first contacting strong aqua from the ammonia feed heater 61 and then liquid ammonia reflux from the condenser 68 removing the water vapor. The ammonia vapor then flows through the flow line 67 to the condenser 68 where the latent heat of vaporization is removed and the ammonia is condensed to a liquid. Part of the liquid ammonia is then refluxed through the line 69 to the reflux tower 64 and the remaining liquid ammonia flows through the four-way valve 35, which directs the flow through the line 37a to the refrigerant head 21a.

It is noted that heat exchange with the fluid passing through the separator vessel 19a further reduces the temperature of the refrigerant, completing the liquefaction of the refrigerant and/or subcooling the liquid refrigerant.

For the purpose of cooling the strong aqua in the absorber cooler 58 and for condensing the ammonia vapors in the condenser 68, the cooling lines 70 and 71 are provided for cycling cooling liquid, such as water, in and out, respectively, to a suitable tower, not shown.

All other flow lines, vessels, valves and mode of operation illustrated in FIGURE 2 are the same as those in FIGURE 1, serve the same purpose, and, accordingly, no further detailed description is deemed necessary or appropriate.

Thus, the apparatus of the invention comprises a pair of separators, each provided with an accumulator, in which separation of condensable vapors is simultaneously provided in one and solids or hydrates previously formed in the other are melted, the vapor flow lines of each separator being interconnected through a heat exchanger thereby providing cooling of incoming gases and condensation of a portion of the condensable vapors thereof by indirect heat relationship therewith, the cooled vapors then being passed to the separator being defrosted to provide cooling for the refrigerant vapors therein thereby returning them to liquid phase. The heat exchanger thus advantageously and effectively utilizes the cooled uncondensed vapors of the cold separation for lowering the temperature of the incoming vapors.

The apparatus also includes a refrigeration cycling assembly in which liquid refrigerant is cooled in the then cold accumulator by indirect heat exchange therewith and then is expanded in an expansion valve and passed to the then cold separator where it vaporizes as it cools the gas in the separator. In one form of the apparatus, a compressor and heat exchanger are provided for repressuring the refrigerant to a level at which liquid will form and for discharging super heat from the system, means being provided for passing the repressured and cooled refrigerant vapors through the other separator in indirect heat exchange relationship so that the cooled gases passing therethrough condense the refrigerant vapors so that they may be returned to the refrigerant accumulator. At this time, of course, the refrigerant vapors melt the solids or hydrates formed on the heat exchanger tubes of the other separator. In another form of the apparatus, an absorption refrigerant system is utilized by which satisfactory results are obtained. The apparatus and system is completely reversible, as mentioned previously, and includes means by which this may be accomplished so that solids formed are melted before the passage of fluids through the apparatus and system is blocked.

The method of the invention has been described in some detail in connection with the apparatus of the invention. The method contemplates, however, a first step in which the incoming vapor stream at a relatively low pressure and moderately high temperature has its temperature reduced in a heat exchanger to a moderately low temperature below hydrate forming temperature at the pressure of the vapor, collecting and recovering condensed liquids from the first step, a second step of reducing the temperature of the uncondensed vapors from the first step in a separator to a very low temperature in which condensable vapors are condensed and liquefied, accumulated and discharged from the system and in which solid hydrates or ice are formed, a third step of advantageously utilizing the cool uncondensed vapors from the second step in the first step for lowering the temperature of the incoming gas, and a fourth step of using the warmed uncondensed vapors from the second and first steps for cooling refrigerant utilized in reducing the temperature of the vapors in the second step. The method is continuous and is reversible, the solids being formed in step 1 being melted while other solids are being formed in this step, and the solids formed in step 2 being melted while the fourth step is the cold or refrigeration step. The method also contemplates cycling liquid refrigerant through the accumulated cold condensed vapors in step 2 for cooling the liquid refrigerant before expanding the same to provide a very low temperature in step 2, the heat transfer in this step converting the liquid refrigerant into vapor refrigerant and includes compressing the refrigerant vapors to a liquid pressure refrigerant level, removing the super heat from the compressed refrigerant vapors and reducing them to a temperature just above the liquid refrigerant forming temperature, and then passing them through the separator used in step 4 for melting the solids formed and for reducing its temperature so that it returns to liquid phase for further use in the method.

Alternatively, the method includes an absorption refrigeration cycle instead of the compression-type cycle in which the refrigerant vapors are passed to an absorber where they are absorbed in a weak refrigerant solution and form a strong refrigerant solution, a portion of which is mixed with weak refrigerant solution and cooled and returned to the absorber, the other portion of which is heated by indirect heat exchange with a weak refrigerant solution from a refrigerant reboiler and then passed to an intermediate tray of a reflux tower of a refrigerant reboiler. A portion of the refrigerant vapors are condensed by cooling for use in the method previously described, and is further cooled by passing it through the accumulated cold condensed vapors in step 2. The other portion is returned to the reflux tower for assisting in removing water vapor from the refrigerant vapors. A weak refrigerant solution from the reboiler is utilized to heat the strong refrigerant solution passing to the reflux tower and then is mixed with the portion of the strong refrigerant solution which is cooled and returned to the absorber, as previously described.

It is understood that the precise operating conditions, temperatures, pressures, and the like will vary considerably depending upon the type of feed, pressures and temperatures thereof, all of which may be determined readily and easily by simple pilot tests. Also, suitable gauges, valves, controls and the like may be used, as desired, depending upon the conditions of the system or systems to which the invention is applied.

As mentioned previously, numerous automatic control systems for switching from the warm to the cool step and back again may be used. For example, as mentioned previously, a time cycle can be used to govern the defrost cycle. Also, a flow controller may be used wherein the defrost cycle is controlled by the total fluids which have been processed.

Also, if desired, a temperature control system wherein either the outlet gas temperature or outlet discharge liquid temperature is measured may be utilized. For example, since the build-up of solids on the external surface of the heat exchanger tube 14b reduces its heat exchange efficiency, an increase in tail gas temperatures in either lines 41 or 41a indicates to an automatic controller that defrosting is in order. Also, other temperature controls may be placed in other portions of the system for this purpose.

It is understood, of course, that while ammonia has been referred to as the refrigerant, others may be used for example, the alcohols, methyl chloride, carbon dioxide and sulfur dioxide, propane, butane, as well as other substances. Also, other refrigeration cycles and assemblies may be used.

The method and apparatus according to the present invention in forming the solids and gas hydrates advantageously removes water vapor and impurities entrained therein from the uncondensed vapors discharged from the system. This advantageously lowers the water dew point of the gas so that the gas is dehydrated. This is important due to the fact that in selling gas it must have a low water dew point. Many systems dehydrate the gas but obtain no other return than the removal of water from the gas. The present system deliberately sets out to form hydrates by which an increased amount of liquefiable fractions of the hydrocarbon vapors are recovered and the water and impurities are removed due to formation of these hydrates in a very economical and reliably efficient manner.

Obviously the above description of the method and apparatus of the invention, which are given for the purpose of disclosure, is merely of a typical arrangement and an example of a particular use. It is understood that the particular arrangement of parts, steps, pressures and temperatures are all variable and the arrangement and operating conditions will vary considerably in view of these and other variables.

The present invention is particularly advantageous in that it provides an economical and reliable method of and apparatus for recovering condensable vapors in relatively low pressure systems or systems in which a pressure drop is not desired, which vapors are normally lost in conventional separation procedures and provides such a method and apparatus for removing impurities from the uncondensable gas without the necessity of adding inhibitors or providing a pressure drop, although these may be utilized to increase the effectiveness of the present invention if desired.

It is therefore apparent that both the apparatus and method of the present invention are well suited to carry out the foregoing objects and attain the ends and advantages mentioned as well as others inherent therein.

Many changes in details, arrangement of parts, operating conditions and the like will readily suggest themselves to those skilled in the art, as well as many and varied applications, which are encompassed within the spirit of the invention and the scope of the appended claims.

What is claimed is:

1. A method of recovering condensable vapors in the presence of water which form hydrates comprising, flowing the mixture into a heat exchanger maintained at a pressure and a temperature at which hydrates form and a portion of the vapors of the mixture condense, flowing uncondensed vapors from the heat exchanger to a first separator maintained at the same pressure as the heat exchanger but at a lower temperature sufficient to condense additional condensable vapors from the uncondensed vapors and to form hydrates, flowing uncondensed cooled vapors from the first separator through the heat exchanger in indirect heat exchange relationship with the mixture therein for maintaining the temperature thereof below hydrate forming temperature as aforesaid, flowing the last-mentioned vapors from the heat exchanger to a second separator and into indirect heat exchange relationship with refrigerant vapors therein for condensing the same, circulating refrigerant in indirect heat exchange relationship in the first and second separators whereby refrigerant is vaporized in the first separator thereby lowering the temperature therein as aforesaid and is condensed in the second separator by indirect heat exchange relationship with the vapors therein as aforesaid including further cooling the refrigerant before circulating the refrigerant in said first separator, as aforesaid, and collecting the condensed liquids from the heat exchanger and the first and second separators.

2. The method of claim 1 including reversing said method comprising the steps of first flowing the uncondensed vapors from the heat exchanger into the second separator, flowing the cooled uncondensed vapors from the second separator through the heat exchanger and then to the first separator, and reversing the circulation of the refrigerant by flowing the refrigerant first through the second separator and then through the first separator and further cooling the refrigerant before returning the refrigerant to the second separator thereby melting the formed solids and forming solids in other corresponding steps of the process.

3. The method of claim 2 including the additional step of initially flowing said refrigerant in indirect heat exchange relationship with the condensed vapors collected in the first separator for cooling the refrigerant and warming the collected condensed vapors therein.

4. The method of claim 3 where the condensable vapors include hydrocarbons.

5. Apparatus for recovering condensable vapors and purifying uncondensable vapors contained in mixtures comprising, a pair of separators, heat exchanger tubes disposed in each separator, a refrigerant cycling assembly connected to said heat exchanger tubes for flowing refrigerant first in the heat exchanger tubes of one of said separators and then in the heat exchanger tubes of the other of said separators for cooling the tubes of the one separator for forming hydrates thereon and then warming the tubes of the other separator for melting hydrates thereon, a heat exchanger, a flow line connected to said heat exchanger for introducing said mixtures into said apparatus, piping connecting said heat exchanger with each separator, additional heat exchanger tubes in said heat exchanger, additional flow lines connected to each separator and said additional heat exchanger tubes in the heat exchanger for flowing uncondensed cooled vapors from one separator through said additional heat exchanger tubes, reversing means for first flowing vapors from the heat exchanger and refrigerant to one of said separators and then to the other of said separators, and discharge means connected at the lower portions of said separators and said heat exchanger for removal of condensed vapors therefrom.

6. The apparatus of claim 5 where the heat exchanger is an elongate cylindrical vessel and the flow lines for introducing said mixtures into said heat exchanger are connected to opposite ends of said heat exchanger whereby solids are formed at one end and melted at the other end upon reversing flow of said mixtures to said heat exchanger.

7. Apparatus for recovering condensable vapors and purifying uncondensable vapors contained in mixtures comprising, a pair of separators, an accumulator disposed at the lower portion of each separator for collection of condensed vapors, heat exchanger tubes disposed in each separator and each accumulator, said heat exchanger tubes of each separator and accumulator being interconnected, a refrigerant cycling assembly connected to the heat exchanger tubes of each accumulator and separator, a heat exchanger, flow lines for introducing said mixtures into said heat exchanger, piping connecting said heat exchanger with each separator, additional heat exchanger tubes in said heat exchanger, additional flow lines connected to each separator and said additional heat exchanger tubes in said heat exchanger for flowing uncondensed cooled vapors from one separator through said additional heat exchanger tubes and then through said other separator, reversing means for first flowing vapors from said heat exchanger and refrigerant to the heat exchanger tubes of one said separator and then to the other separator and the heat exchanger tubes in said other separator, and discharge means at the lower portion of said separators and said heat exchanger for removal of condensed vapors therefrom.

References Cited in the file of this patent

UNITED STATES PATENTS

| | | |
|---|---|---|
| 2,689,875 | Hachmuth et al. | Sept. 21, 1954 |
| 2,728,406 | Moher | Dec. 27, 1955 |
| 2,747,002 | Walker et al. | May 22, 1956 |
| 2,758,665 | Francis | Aug. 14, 1956 |
| 2,866,834 | Donnelly | Dec. 30, 1958 |
| 2,884,764 | Siggelin | May 5, 1959 |